United States Patent
Lahiri et al.

(10) Patent No.: US 9,401,866 B2
(45) Date of Patent: Jul. 26, 2016

(54) DATA PACKET ROUTING

(71) Applicant: Microsoft Technology Licensing, LLC, Redmond, WA (US)

(72) Inventors: Parantap Lahiri, Redmond, WA (US); Marek Jedrzejewicz, Kirkland, WA (US); Monika Machado, Sammamish, WA (US); Naresh Sundaram, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/682,482

(22) Filed: Apr. 9, 2015

(65) Prior Publication Data
US 2016/0072710 A1    Mar. 10, 2016

Related U.S. Application Data

(63) Continuation of application No. 13/675,712, filed on Nov. 13, 2012, now Pat. No. 9,008,096.

(51) Int. Cl.
*H04L 12/781* (2013.01)
*H04L 12/56* (2006.01)
*H04L 29/12* (2006.01)

(52) U.S. Cl.
CPC ............ *H04L 45/741* (2013.01); *H04L 61/251* (2013.01); *H04L 61/2535* (2013.01)

(58) Field of Classification Search
None
See application file for complete search history.

(56) References Cited

U.S. PATENT DOCUMENTS

| | | | |
|---|---|---|---|
| 6,957,274 B2 | 10/2005 | Trace et al. | |
| 6,978,364 B1 | 12/2005 | Balaz et al. | |
| 7,085,270 B2 * | 8/2006 | Inouchi | H04L 12/4641 370/392 |
| 7,483,439 B2 | 1/2009 | Shepherd et al. | |
| 7,526,571 B1 | 4/2009 | Tappan et al. | |
| 2004/0240468 A1 * | 12/2004 | Chin | H04L 29/12066 370/466 |
| 2005/0286553 A1 | 12/2005 | Wetterwald et al. | |
| 2006/0209885 A1 | 9/2006 | Hain et al. | |
| 2006/0248202 A1 | 11/2006 | Blanchet et al. | |
| 2006/0251088 A1 | 11/2006 | Thubert et al. | |

OTHER PUBLICATIONS

Metz, et al., "Beyond MPLS . . . Less Is More", Retrieved at <<http://ieeexplore.ieee.org/stamp/stamp.jsp?tp&arnumber=4305571>>, In Proceedings of IEEE, Internet Computing, vol. 11, Issue 5, Sep. 2007, pp. 5.

(Continued)

*Primary Examiner* — Ayaz Sheikh
*Assistant Examiner* — Tarell Hampton
(74) *Attorney, Agent, or Firm* — Henry Gabryjelski; Harri Valio; Micky Minhas

(57) ABSTRACT

Among other things, one or more techniques and/or system are provided for routing a data packet. Because the data packet may correspond to a source device having an address on a first network that may be similar to an address of a second device on a second network, the data packet may be translated to create a transformed data packet that may be distinguishable from data packets of the second device. For example, the data packet may be translated from a first address format, such as IPv4, to a second address format, such as IPv6, to create a transformed data packet. The transformed data packet may comprise a prefix that may distinctly identify the source device during routing. In this way, the transformed data packet may be identifiable as corresponding to the source device during routing through a network to a destination device.

20 Claims, 7 Drawing Sheets

(56) References Cited

OTHER PUBLICATIONS

"Easy Virtual Network-Simplifying Layer 3 Network Virtualization", Retrieved at <<http://www.cisco.com/en/US/prod/collateral/iosswrel/ps6537/ps6557/ps6604/whitepaper_c11-638769.pdf>>, Sep. 3, 2012, pp. 14.

Caindec, S. Keao., "Ethernet VPLS—An Alternate to IP MPLS for Post-Frame Relay Communications", Retrieved at <<http://convergedigest.com/bp/bp1.asp?ID=480&ctgy=>>, May 29, 2007, pp. 4.

Clercq, et al., "BGP-MPLS IP Virtual Private Network (VPN)Extension for IPv6 VPN", Retrieved at <<http:/www.ietf.org/rfc/rfc4659.txt>>, Sep. 2006, pp. 17.

Williams, Mark., "IPv6 and IPv6 services over MPLS", Retrieved at <<http://www.apan.net/meetings/manila2007/presentations/ipv6/mpls.pdf>>, Sep. 30, 2008, pp. 47.

Langmaid, Martin., "Finally a Cost Effective Alternative to MPLS & Leased Lines", Retrieved at <<http://www.plussconnect.org.uk/2012/02/ inally-a-cost-effective-alternative-to-mpls-leased-lines/>>, Sep. 3, 2012, pp. 6.

Int. Search Report cited in PCT Application No. PCT/US2013/069737 dated Feb. 10, 2014, 28 pgs.

Bao, et al., "IPv6 Addressing of IPv4/IPv6 Translators", Oct. 2010, 18 pages. Available at <<http://tools.ietf.org/html/rfc6052>>.

Office Action dated May 22, 2014 cited in U.S. Appl. No. 13/675,712.

Notice of Allowance dated Dec. 8, 2014 cited in U.S. Appl. No. 13/675,712.

* cited by examiner

DATA PACKET ROUTING

RELATED APPLICATION

This application is a continuation of and claims priority to U.S. application Ser. No. 13/675,712, filed on Nov. 13, 2012, entitled "DATA PACKET ROUTING", at least some of which may be incorporated herein.

BACKGROUND

Today, many computing devices, such as tablet devices, laptops, desktops, mobile phones, etc., are interconnected by one or more networks. In one example, computing devices of a bank may be interconnected over a bank network, while computing devices of a retail store may be interconnected over a retail store network. When a computing device attempts to access remote resources outside of a local network (e.g., a website, a file sharing web service, an email service, etc.) the computing device may send and receive data packets that are routed through various networks. For example, a bank computing device, a retail store computing device, and/or computing devices of other networks may access file sharing functionality provided by a file sharing web service. Because the file sharing web service may provide file sharing functionality for multiple client networks, the file sharing web service may communicate with client networks having overlapping address space. For example, a retail store computing device on the retail store network may be assigned an IP address that is the same as an IP address assigned to a bank computing device on the bank network. Accordingly, the file sharing web service may utilize layer 3 virtual private network technology and/or multiprotocol switch technology to distinguish between the retail store computing device and the bank computing device.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for routing a data packet are provided herein. That is, a data packet from a source device may be received. The data packet may be formatted according to a first address format, such as IPv4. For example, a retail store computing device on a retail store network may send the data packet, requesting email data, to a destination email web service. The data packet may comprise a source address (e.g., an IP address of the retail store computing device formatted according to an IPv4 format) and/or a destination address (e.g., an IP address of the destination email web service formatted according to the IPv4 format). Because the source address and/or the destination address may conflict with other addresses associated with computing devices of other networks (e.g., a bank computing device on a bank virtual private network may have the same source address as the retail store computing device on the retail network), the data packet may be translated from the first address format to a second address format, such as IPv6, to create a transformed data packet that may be distinctly identifiable. In one example, a first IPv6 prefix may be added to an IPv4 source address to create an IPv6 source address that may distinctly identify the retail store computing device. In another example, a second IPv6 prefix may be added to an IPv4 destination address to create an IPv6 destination address that may distinctly identify the destination email web service. In this way, the transformed data packet may be routed through a network, such as an IPv6 enabled network, according to the second address format to a translation device, such as an edge router associated with a network of the destination email web service.

In one example, the translation device may translate the transformed data packet from the second address format to the first address format to create a deliverable data packet. For example, the transformed data packet may be translated from IPv6 to IPv4 by removing the first IPv6 prefix from the IPv6 source address to obtain the IPv4 source address and/or by removing the second IPv6 prefix from the IPv6 destination address to identify the IPv4 destination address. In this way, addressing conflicts with other data packets associated with computing devices having similar IPv4 source addresses as the retail store computing may be mitigated during delivery of the deliverable data packet to the destination email web service.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
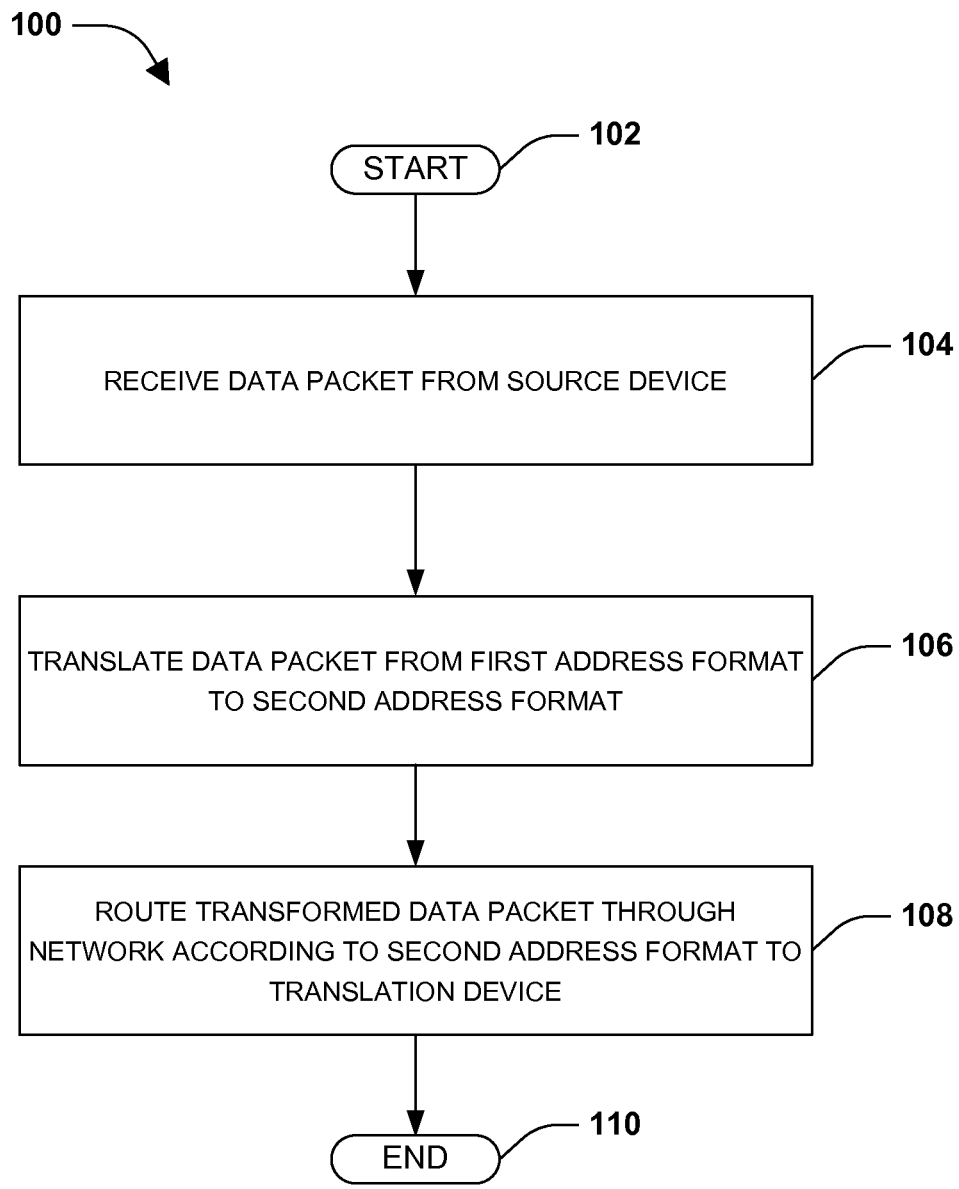
FIG. 1 is a flow diagram illustrating an exemplary method of routing a data packet.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Because entities, such as businesses, may create networks with overlapping address space (e.g., a virtual private network of a retail store may have similar IP address as a virtual private network of a bank), addressing conflicts may arise during data packet routing. Conventional techniques for distinguishing between data packets of various computing devices may utilize expensive technology that may not be practical to implement, such as for low cost mobile devices. Accordingly, as provided herein, data packet routing may be accomplished by translating data packets from a first address format (e.g., an IPv4 address that may be used by various networks) to a second address format (e.g., an IPv6 address having an IPv6 prefix that distinctly identifies computing devices) that may be used to distinguish amongst source computing devices and/or destination computing devices.

One embodiment of routing a data packet is illustrated by an exemplary method 100 in FIG. 1. At 102, the method starts. At 104, a data packet may be received from a source device (e.g., a retail store computing device on a retail store virtual private network may request email data from a destination email web service). The data packet may be formatted according to a first address format. For example, the data packet may comprise a source address of the source device (e.g., an IPv4 address, such as 10.1.1.1) and/or a destination address of a destination device (e.g., an IPv4 address, such as 192.168.1.1) formatted according to the first address format.

Because the source address and/or the destination address may be similar to an address of another device (e.g., a bank computing device of a bank virtual private network, which may also utilize email functionality from the destination email web service, may also be assigned an IPv4 address of 10.1.1.1), the data packet may be translated from the first address format to a second address format to create a transformed data packet that may be distinguishable from data packets originating from computing devices with similar addresses, at 106. The transformed data packet may comprise a translated source address and/or a translated destination address formatted according to the second address format, such as an IPv6 format. In one example, a first prefix (e.g., a first IPv6 prefix, such as 2033.11.00.0001) may be added to the source address (e.g., the IPv4 address of 10.1.1.1) of the source device to create a translated source address (e.g., 2033.11.00.0001::10.1.1.1), which may be distinguishable from other data packets associated with computing devices having addresses of 10.1.1.1. In another example, a second prefix (e.g., a second IPv6 prefix, such as 2044.11.00.0001) may be added to the destination address (e.g., the IPv4 address of 192.168.1.1) of the destination device to create a translated destination address (e.g., 2044.11.00.0001::192.168.1.1), which may be distinguishable from other data packets associated with computing devices having addresses of 192.168.1.1.

At 108, the transformed data packet may be routed through a network according to the second address format to a translation device (e.g., an edge router of a network associated with the destination device for further processing). In one example, the translation device may deliver the transformed data packet to the destination device. In another example, the translation device may translate the transformed data packet from the second address format to the first address format to create a deliverable data packet. For example, the translation device may remove the first prefix (e.g., the first IPv6 prefix of 2033.11.00.0001) from the translated source address to obtain the source address (e.g., 10.1.1.1) and/or the translation device may remove the second prefix (e.g., the second IPv6 prefix of 2044.11.00.0001) from the translated destination address to obtain the destination address (e.g., 192.168.1.1). In this way, the deliverable data packet may be routed to the destination device based upon the first address format.

In one example where the data packet may be distinguishable from a second data packet, a second data packet may be received from a second source device (e.g., the bank computing device having a source address of 10.1.1.1 that is the same as the source address of the retail store computing device). The second data packet may be formatted according to the first address, such as IPv4. The second data packet may be translated from the first address format to the second address format to create a second transformed data packet (e.g., an IPv6 prefix of 2055.00.00.0001 may be added to the source address of 10.1.1.1 to create a second translated source address of 2055.00.00.0001::10.1.1.1). The second translated source address (e.g., 2055.00.00.0001::10.1.1.1) may be different than the translated source address of the transformed data packet (e.g., 2033.11.00.0001::10.1.1.1). In this way, the second transformed data packet may be routed through the network according to the second address format to a second translation device for delivery to a second destination device and/or for translation from the second address format to the first address format. In this way, the transformed data packet and the second transformed data packet may be distinguishable from one another, which may mitigate address conflicts during processing and/or routing. At 110, the method ends.

Figure 2:
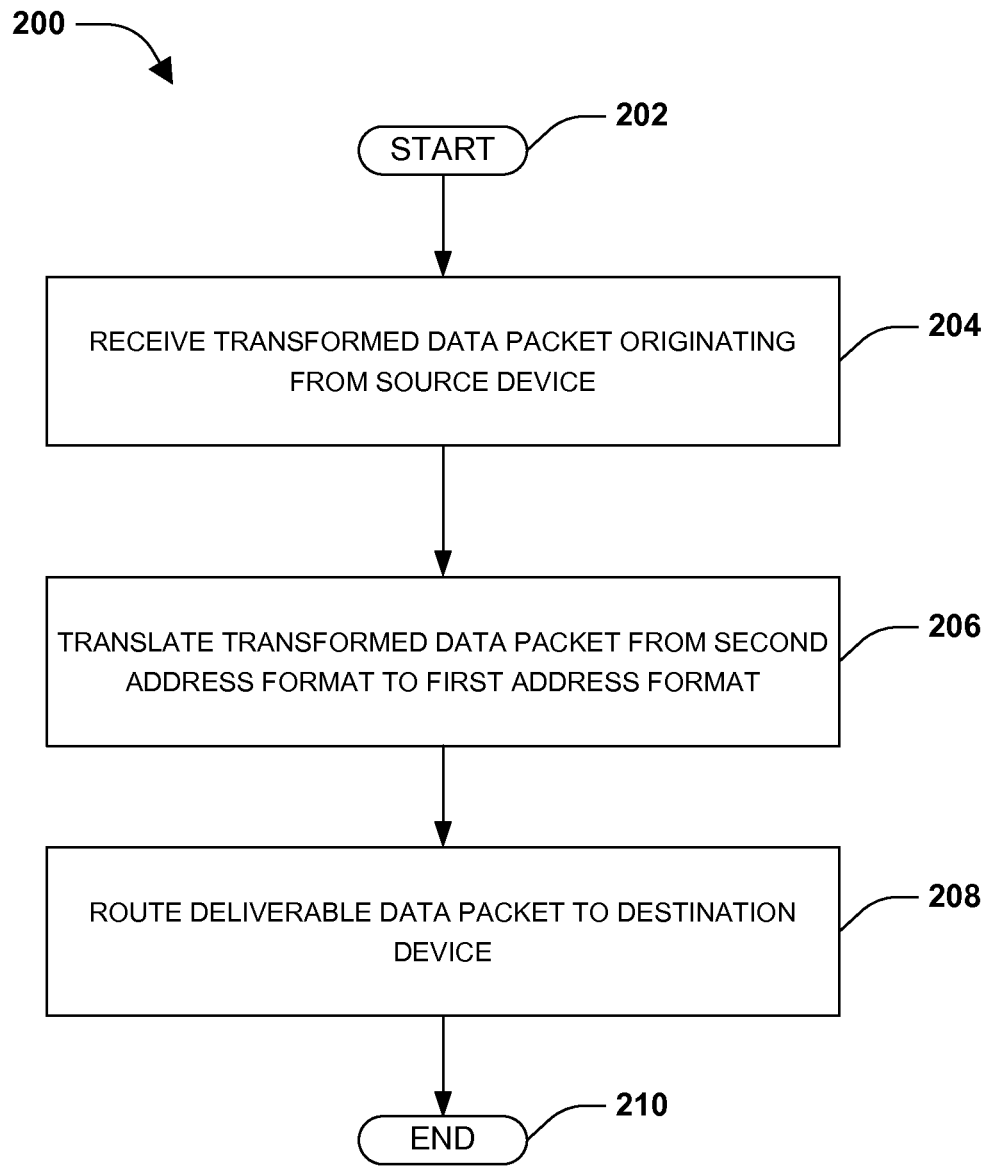
FIG. 2 is a flow diagram illustrating an exemplary method of routing a data packet.

One embodiment of routing a data packet is illustrated by an exemplary method 200 in FIG. 2. At 202, the method starts. At 204, a transformed data packet originating from a source device may be received. It may be appreciated that in one example, the transformed data packet may correspond to the transformed data packet that was routed to the translation device in example 100 of FIG. 1. The transformed data packet may be formatted according to a second address format (e.g., the transformed data packet may comprise a translated source address of the source device and/or a translated destination address of a destination device, which may be formatted according to an IPv6 format). At 206, the transformed data packet may be translated from the second address format to a first address format, such as IPv4, to create a deliverable data packet. In one example, a first prefix (e.g., a first IPv6 prefix) may be removed from the translated source address (e.g., an IPv6 source address) to create a source address (e.g., an IPv4 source address) of the source device. In another example, a second prefix (e.g., a second IPv6 prefix) may be removed from the translated destination address (e.g., an IPv6 destination address) to create a destination address (e.g., an IPv4 destination address) of the destination device. At 208, the deliverable data packet may be routed to the destination device based upon the first address format (e.g., based upon the IPv4 destination address). At 210, the method ends.

Figure 3:
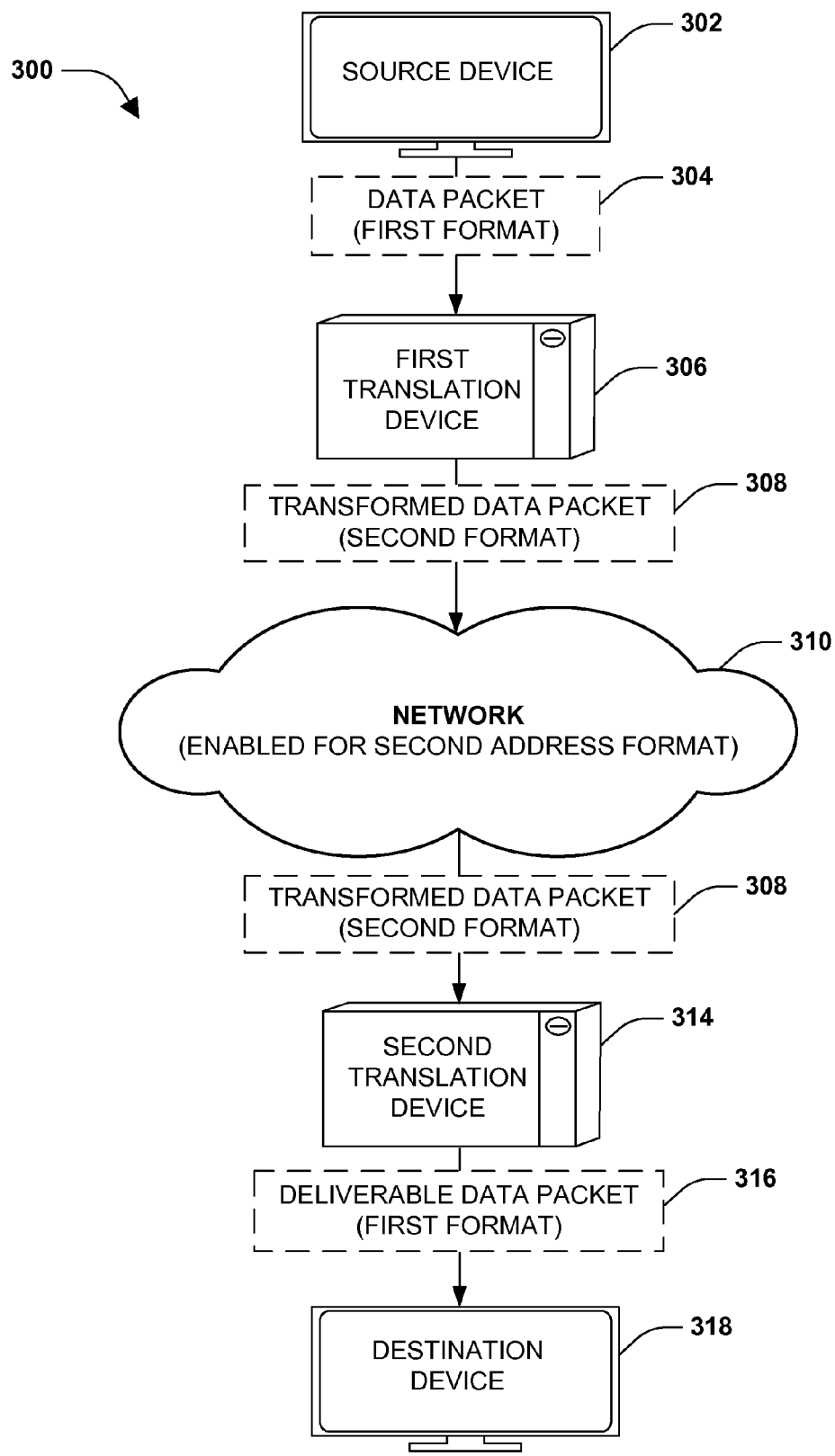
FIG. 3 is a component block diagram illustrating an exemplary system for routing a data packet.

FIG. 3 illustrates an example of a system 300 configured for routing a data packet 304. The system 300 may comprise a first translation device 306 and/or a second translation device 314. The first translation device 306 may be configured to receive the data packet 304 from a source device 302. The data packet 304 may be formatted according to a first address format. The first translation device 306 may translate the data packet 304 from the first address format to a second address format to create a transformed data packet 308. In one example, the first translation device 306 may add a first prefix to a source address of the source device to create a translated source address. In another example, the first translation device 306 may add a second prefix to a destination address of a destination device 318 to create a translated destination address. The first translation device 306 may route the transformed data packet 308 through a network 310 (e.g., a network enabled for the second address format) according to the second address format to the second translation device 314.

In one example, the second translation device 314 may be configured to deliver the transformed data packet 308 to the destination device 318. In another example, the second translation device 314 may be configured to translate the transformed data packet 308 from the second address format to the first address format to create a deliverable data packet 316. The second translation device 314 may translate the transformed source address from the second address format to the first address format to obtain the source address of the source device 302. The second translation device 314 may translate the transformed destination address from the second address format to the first address format to obtain the destination address of the destination device 318. The second translation device 314 may route the deliverable data packet 316 to the destination device 318 based upon the source address and/or the destination address that may be formatted according to the first address format.

Figure 4:
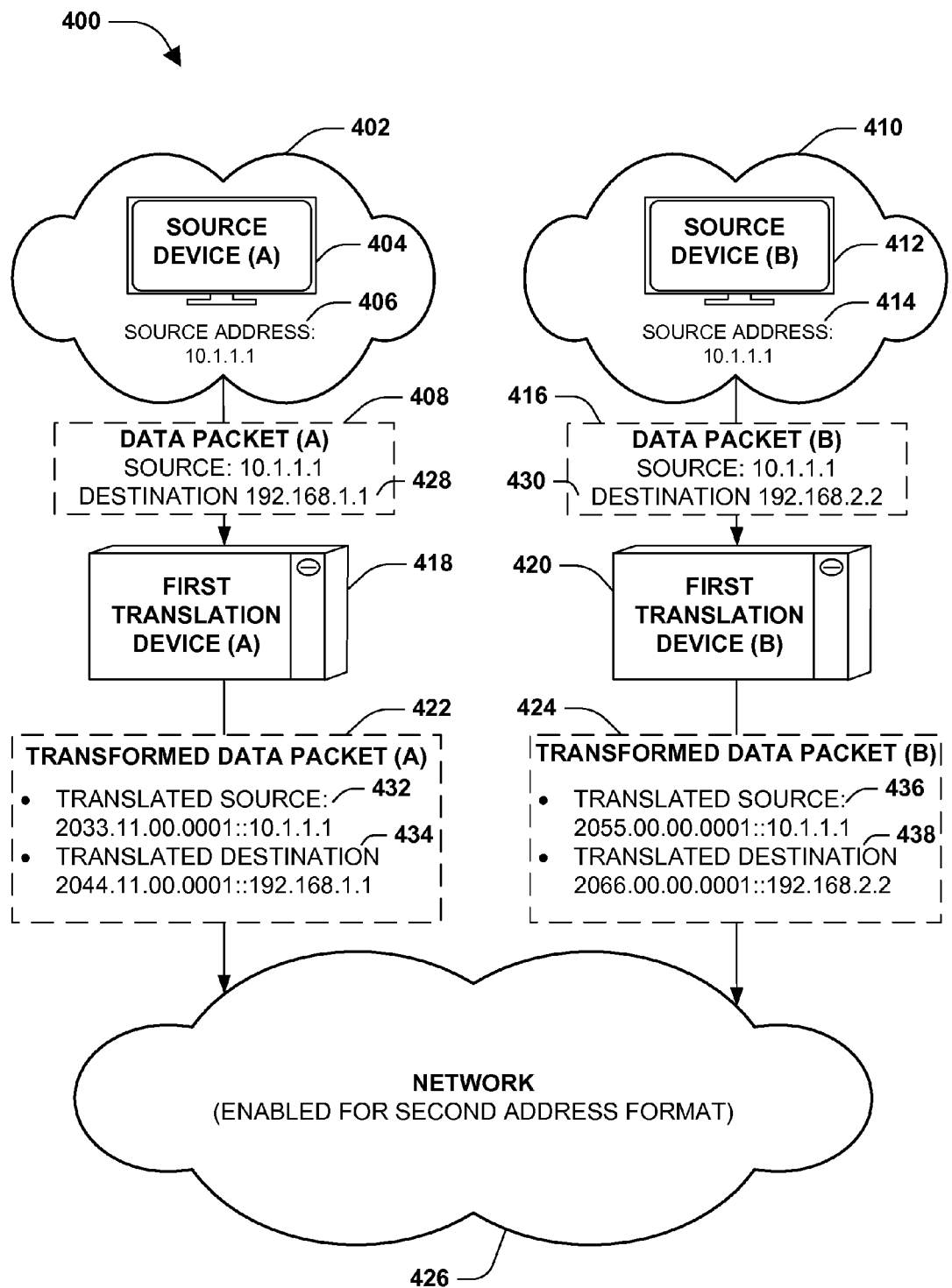
FIG. 4 is an illustration of an example of distinguishing between a first data packet and a second data packet during routing to mitigate addressing conflicts.

FIG. 4 illustrates an example 400 of distinguishing between a first data packet and a second data packet during routing to mitigate addressing conflicts. A source device (A) 404 may be connected to a network (A) 402. The source device (A) 404 may be assigned a first source address 406 of 10.1.1.1 by the network (A) 402. The source device (A) 404 may create a data packet (A) 408 corresponding to a request for file sharing data from a destination device (A) not illustrated (e.g., destination device (A) 510 of FIG. 5). The data packet (A) 408 may comprise the first source address 406 of 10.1.1.1 for the source device (A) 404 and/or a first destination address 428 of 192.168.1.1 for the destination device (A). The first source address 406 and/or the first destination address 428 may be formatted according to a first address format, such as IPv4.

A source device (B) 412 may be connected to a network (B) 410. The source device (B) 412 may be assigned a second source address 414 of 10.1.1.1 by the network (B) 410. The source device (B) 412 may create a data packet (B) 416 corresponding to a request for email data from a destination device (B) not illustrated (e.g., destination device (B) 512 of FIG. 5). The data packet (B) 416 may comprise the second source address 414 of 10.1.1.1 for the source device (B) 412 and/or a second destination address 430 of 192.168.2.2 for the destination device (B). The second source address 414 and/or the second destination address 430 may be formatted according to the first address format, such as IPv4.

Because the second source address 414 of the source device (B) 412 may be similar to the first source address 406 of the source device (A) 404, conflicts may arise during routing of data packet (A) 408 and/or data packet (B) 416. Accordingly, as provided herein, the data packet (A) 408 and/or the data packet (B) 416 may be translated to create transformed data packets, such as a transformed data packet (A) 422 and/or a transformed data packet (B) 424, that are distinguishable from one another.

In one example, a first translation device (A) 418 may receive the data packet (A) 408. The first translation device (A) 418 may translate the data packet (A) 408 from the first address format to a second address format, such as IPv6, to create the transformed data packet (A) 422. For example, the first translation device (A) 418 may add a first prefix of 2033.11.00.0001 to the first source address 406 of 10.1.1.1 to create a first translated source address 432 of 2033.11.00.0011::10.1.1.1. The first translation device (A) 418 may add a second prefix of 2044.11.00.0001 to the first destination address 428 of 192.168.1.1 to create a first translated destination address 434 of 2044.11.00.0001::192.168.1.1. In this way, the transformed data packet (A) 422 may be distinctly identifiable based upon the first translated source address 432 of 2033.11.00.0011::10.1.1.1 and/or the first translated destination address 434 of 2044.11.00.0001::192.168.1.1.

In another example, a first translation device (B) 420 may receive the data packet (B) 416. The first translation device (B) 420 may translate the data packet (B) 416 from the first address format to a second address format, such as IPv6, to create the transformed data packet (B) 424. For example, the first translation device (B) 420 may add a third prefix of 2055.00.00.0001 to the second source address 414 of 10.1.1.1 to create a second translated source address 436 of 2055.00.00.0001::10.1.1.1. The first translation device (B) 420 may add a fourth prefix of 2066.00.00.0001 to the second destination address 430 of 192.168.2.2 to create a second translated destination address 438 of 2066.00.00.0001::192.168.2.2. In this way, the transformed data packet (B) 424 may be distinctly identifiable based upon the second translated source address 436 of 2055.00.00.0001::10.1.1.1 and/or the second translated destination address 438 of 2066.00.00.0001::192.168.2.2. For example, the first translated source address 432 of 2033.11.00.0011::10.1.1.1 may be distinguishable from the second translated source address 436 of 2055.00.00.0001:: 10.1.1.1 during routing within a network 426.

Figure 5:
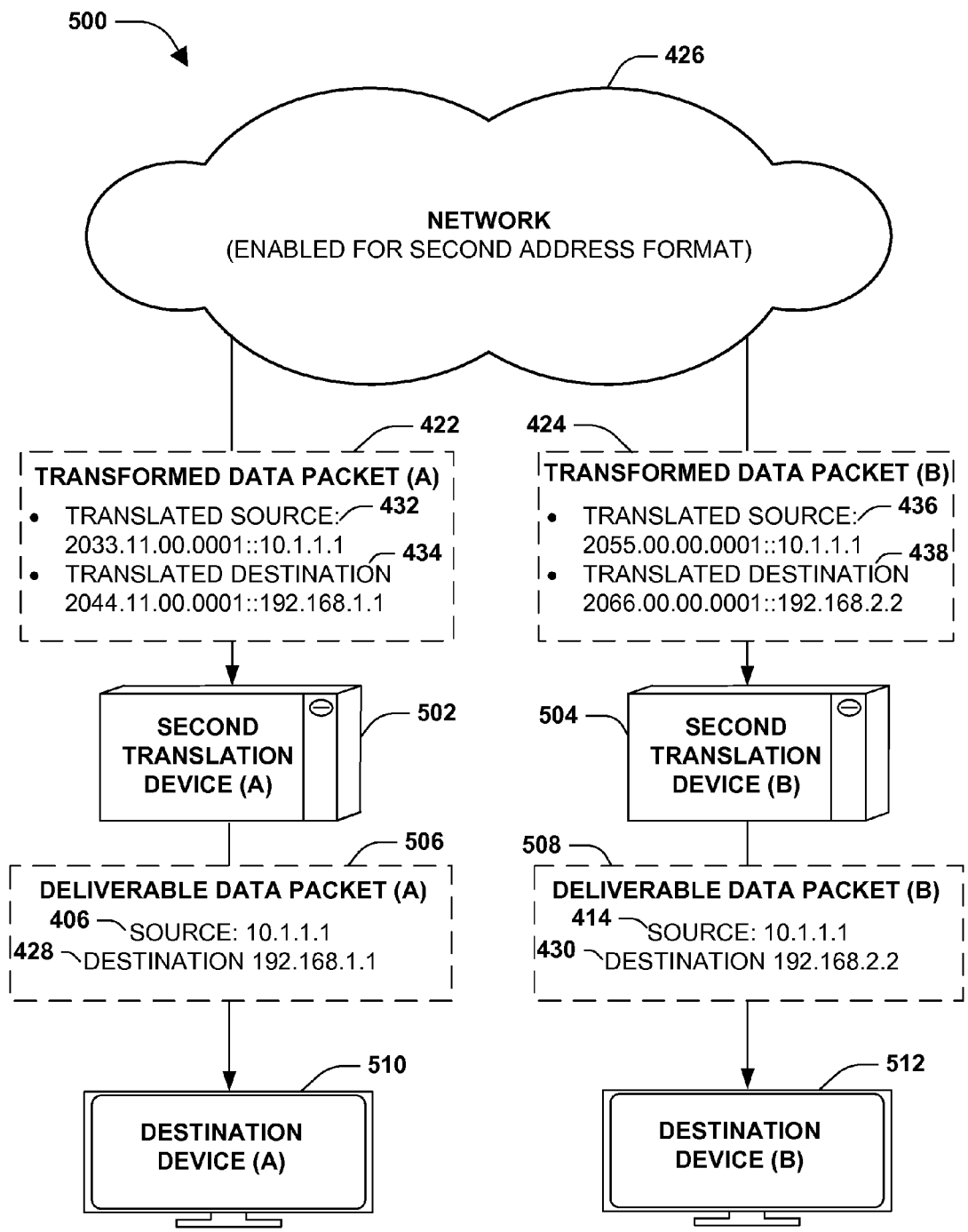
FIG. 5 is an illustration of an example of distinguishing between a first data packet and a second data packet during routing to mitigate addressing conflicts.

FIG. 5 illustrates an example 500 of distinguishing between a first data packet and a second data packet during routing to mitigate addressing conflicts. It may be appreciated that in one example, the network 426, the transformed data packet (A) 422, and/or the transformed data packet (B) 424 may correspond to example 400 of FIG. 4 (e.g., the transformed data packet (A) 422 may have been derived from a data packet (A) 408 of a source device (A) 404 and/or the transformed data packet (B) 424 may have been derived from a data packet (B) 416 of source device (B) 412).

A second translation device (A) 502 may receive the transformed data packet (A) 422. The transformed data packet (A) 422 may be formatted according to a second address format, such as IPv6. For example, the transformed data packet (A) 422 may comprise a first translated source address 432 of 2033.11.00.0001::10.1.1.1 and/or a first translated destination address 434 of 2044.11.00.0001::192.168.1.1. The second translation device (A) 502 may be configured to translate the transformed data packet (A) 422 from the second address format to a first address format, such as IPv4, to create a deliverable data packet (A) 506. In one example, the second translation device (A) 502 may transform the first translated source address 432 to a first source address 406 of 10.1.1.1 by removing a first prefix of 2033.11.00.0001 from the first translated source address 432. In another example, the second translation device (A) 502 may transform the first translated destination address 434 to a first destination address 428 of 192.168.1.1 by removing a second prefix of 2044.11.00.0001 from the first translated destination address 434. In this way, the second translation device (A) 502 may route the deliverable data packet (A) 506 to the destination device (A) 510 based upon the first source address 406 and/or the first destination address 428.

A second translation device (B) 504 may receive the transformed data packet (B) 424. The transformed data packet (B) 424 may be formatted according to the second address format, such as IPv6. For example, the transformed data packet (B) 424 may comprise a second translated source address 436 of 2055.00.00.0001::10.1.1.1 and/or a second translated destination address 438 of 2066.00.00.0001::192.168.2.2. The second translation device (B) 504 may be configured to translate the transformed data packet (B) 424 from the second address format to the first address format, such as IPv4, to create a deliverable data packet (B) 508. In one example, the second translation device (B) 504 may transform the second translated source address 436 to a second source address 414 of 10.1.1.1 by removing a third prefix of 2055.00.00.0001 from the second translated source address 436. In another example, the second translation device (B) 504 may transform the second translated destination address 438 to a second destination address 430 of 192.168.2.2 by removing a fourth prefix of 2066.00.00.0001 from the second translated destination address 438. In this way, the second translation device (B) 504 may route the deliverable data packet (B) 508 to the destination device (B) 512 based upon the second source address 414 and/or the second destination address 430.

Figure 6:
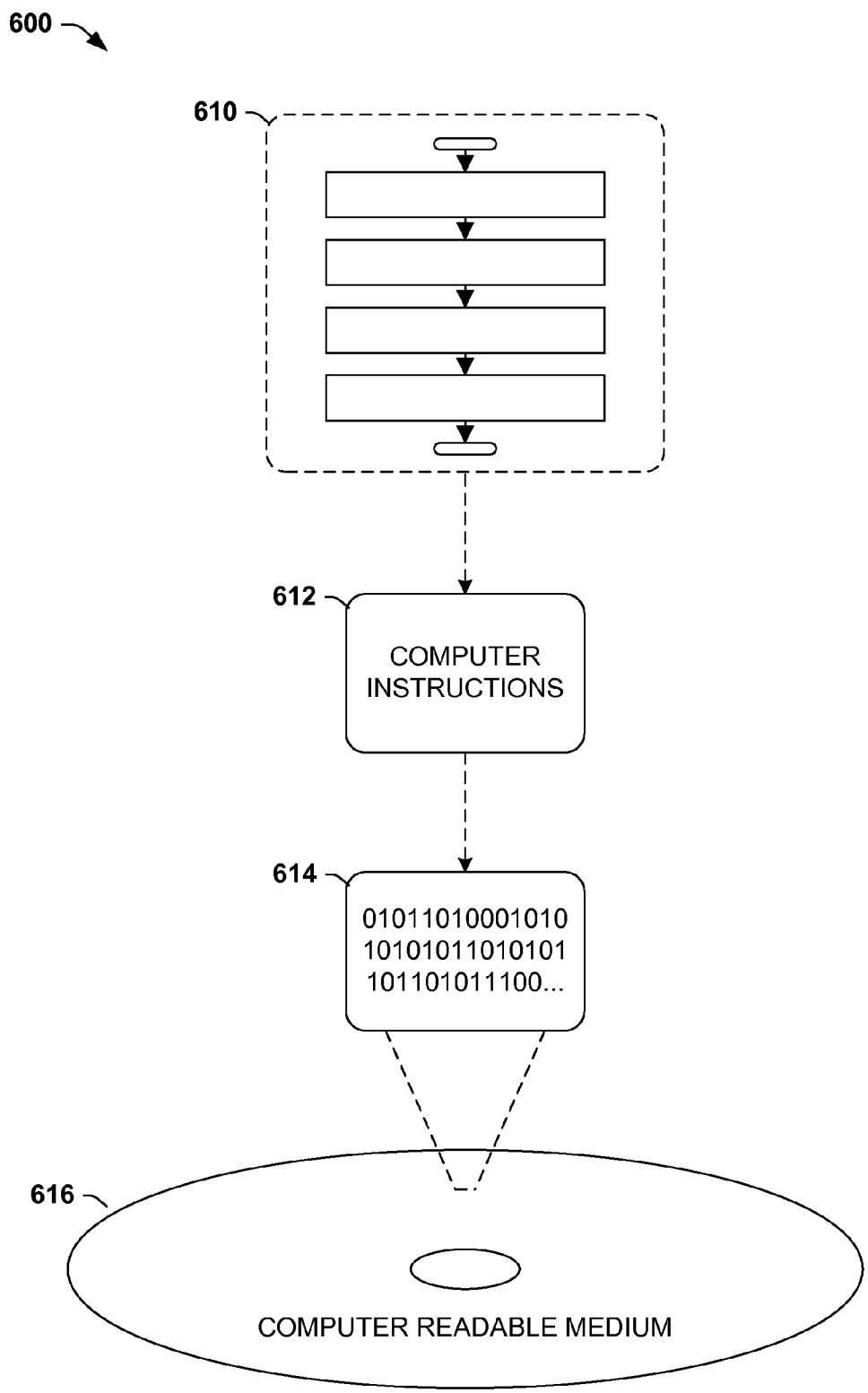
FIG. 6 is an illustration of an exemplary computing device-readable medium wherein processor-executable instructions configured to embody one or more of the provisions set forth herein may be comprised.

Still another embodiment involves a computing device-readable medium comprising processor-executable instructions configured to implement one or more of the techniques presented herein. An exemplary computing device-readable medium that may be devised in these ways is illustrated in FIG. 6, wherein the implementation 600 comprises a computing device-readable medium 616 (e.g., a CD-R, DVD-R, or a platter of a hard disk drive), on which is encoded computing device-readable data 614. This computing device-readable data 614 in turn comprises a set of computing device instructions 612 configured to operate according to one or more of the principles set forth herein. In one such embodiment 600, the processor-executable computing device instructions 612 may be configured to perform a method 610, such as at least some of the exemplary method 100 of FIG. 1 and/or at least some of exemplary method 200 of FIG. 2, for example. In another such embodiment, the processor-executable instructions 612 may be configured to implement a system, such as at least some of the exemplary system 300 of FIG. 3, for example. Many such computing device-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computing device-related entity, either hardware, a combination of hardware and software, software, or software in execution. For example, a component may be, but is not limited to being, a process running on a processor, a processor, an object, an executable, a thread of execution, a program, and/or a computing device. By way of illustration, both an application running on a controller and the controller can be a component. One or more components may reside within a process and/or thread of execution and a component may be localized on one computing device and/or distributed between two or more computing devices.

Furthermore, the claimed subject matter may be implemented as a method, apparatus, or article of manufacture using standard programming and/or engineering techniques to produce software, firmware, hardware, or any combination thereof to control a computing device to implement the disclosed subject matter. The term "article of manufacture" as used herein is intended to encompass a computing device program accessible from any computing device-readable device, carrier, or media. Of course, those skilled in the art will recognize many modifications may be made to this configuration without departing from the scope or spirit of the claimed subject matter.

Figure 7:
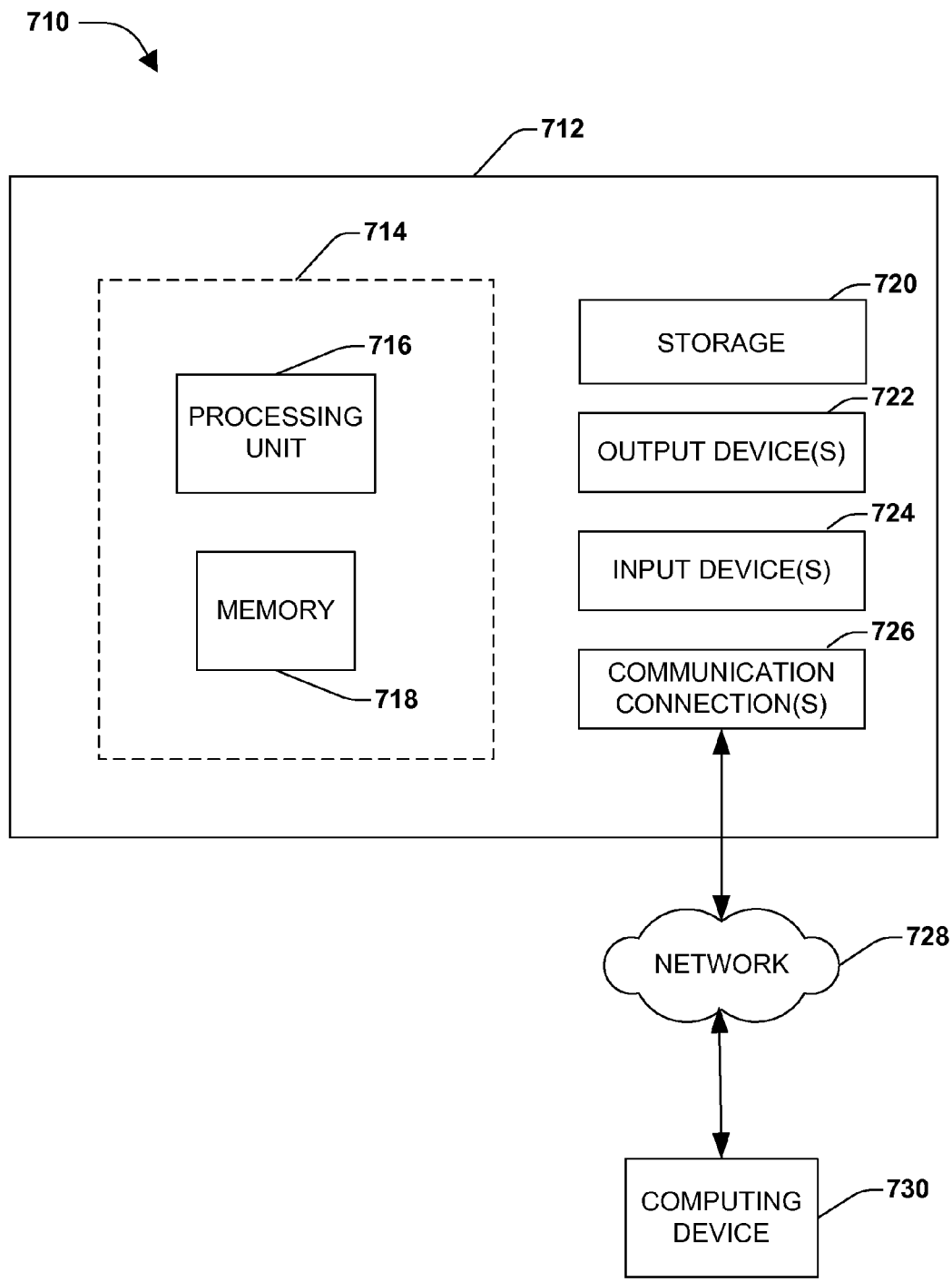
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computing devices, server computing devices, hand-held or laptop devices, mobile devices (such as mobile phones, Personal Digital Assistants (PDAs), media players, and the like), multiprocessor systems, consumer electronics, mini computing devices, mainframe computing devices, distributed computing environments that include any of the above systems or devices, and the like.

Although not required, embodiments are described in the general context of "computing device readable instructions" being executed by one or more computing devices. Computing device readable instructions may be distributed via computing device readable media (discussed below). Computing device readable instructions may be implemented as program modules, such as functions, objects, Application Programming Interfaces (APIs), data structures, and the like, that perform particular tasks or implement particular abstract data types. Typically, the functionality of the computing device readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computing device readable instructions to implement one or more embodiments provided herein may be in storage 720. Storage 720 may also store other computing device readable instructions to implement an operating system, an application program, and the like. Computing device readable instructions may be loaded in memory 718 for execution by processing unit 716, for example.

The term "computing device readable media" as used herein includes computing device storage media. Computing device storage media includes volatile and nonvolatile, removable and non-removable media implemented in any method or technology for storage of information such as computing device readable instructions or other data. Memory 718 and storage 720 are examples of computing device storage media. Computing device storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computing device storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computing device readable media" may include communication media. Communication media typically embodies computing device readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computing device readable instructions may be distributed across a network. For example, a computing device 730 accessible via a network 728 may store computing device readable instructions to implement one or more embodiments provided herein. Computing device 712 may access computing device 730 and download a part or all of the computing device readable instructions for execution. Alternatively, computing device 712 may download pieces of the computing device readable instructions, as needed, or some instructions may be executed at computing device 712 and some at computing device 730.

Various operations of embodiments are provided herein. In one embodiment, one or more of the operations described may constitute computing device readable instructions stored on one or more computing device readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer system, comprising:
one or more processors; and
one or more computer-readable media having stored thereon computer-executable instructions that are executable by the one or more processors to cause the computer system to route data packets, the computer-executable instructions including instructions that are executable to cause the computer system to perform at least the following:
receive, at a translation device, a first data packet from a first source device over a network, the first data packet formatted according to a first address format and being addressed to a first destination device having a first destination address formatted according to a second different address format, the first data packet comprising a translation of the first destination address that is formatted according to the first address format;
translate the first data packet from the first address format to the second address format to create a transformed first data packet, the transformed first data packet comprising the first destination address of the first destination device formatted according to the second address format;

deliver the transformed first data packet to the first destination device based on the first destination address that is formatted according to the second address format;

receive, at the translation device, a second data packet from a second source device over the network, the second data packet formatted according to the first address format and being addressed to a second destination device having a second destination address that corresponds to the first destination device and that is formatted according to the second address format, the second data packet comprising a translation of the second destination address that is formatted according to the first address format;

translate the second data packet from the first address format to the second address format to create a transformed second data packet, the transformed second data packet comprising the second destination address of the second destination device formatted according to the second address format; and deliver the transformed second data packet to the second destination device based on the second destination address that is formatted according to the second address format.

2. The computer system of claim 1, wherein translating the first data packet comprises removing a prefix, associated with the first address format, from the first destination address formatted according to a second different address format, to obtain the first destination address formatted according to the second address format.

3. The computer system of claim 2, wherein the prefix comprises an IPv6 prefix.

4. The computer system of claim 1, wherein the first address format comprises IPv6 and the second address format comprises IPv4.

5. The computer system of claim 1, wherein translating the first data packet comprises at least one of:
    removing a first IPv6 prefix from an IPv4 source address to obtain the IPv4 source address; or
    removing a second IPv6 prefix from an IPv4 destination address to obtain the IPv4 destination address.

6. The computer system of claim 1, wherein the first destination device is within a first virtual private network.

7. The computer system of claim 6, wherein the second destination device is within a second virtual private network.

8. The computer system of claim 7, wherein the first virtual private network and the second virtual private network share the same address space.

9. A method, implemented at a computer system that includes one or more processors, for routing data packets, the method comprising:
    receiving a first data packet from a first source device over a network, the first data packet formatted according to a first address format and being addressed to a first destination device having a first destination address formatted according to a second different address format, the first data packet comprising a translation of the first destination address that is formatted according to the first address format;
    translating the first data packet from the first address format to the second address format to create a transformed first data packet, the transformed first data packet comprising the first destination address of the first destination device formatted according to the second address format;
    delivering the transformed first data packet to the first destination device based on the first destination address that is formatted according to the second address format;
    receiving a second data packet from a second source device over the network, the second data packet formatted according to the first address format and being addressed to a second destination device having a second destination address that corresponds to the first destination device and that is formatted according to the second address format, the second data packet comprising a translation of the second destination address that is formatted according to the first address format;
    translating the second data packet from the first address format to the second address format to create a transformed second data packet, the transformed second data packet comprising the second destination address of the second destination device formatted according to the second address format; and
    delivering the transformed second data packet to the second destination device based on the second destination address that is formatted according to the second address format.

10. The method of claim 9, wherein translating the first data packet comprises removing a prefix, associated with the first address format, from the first destination address formatted according to a second different address format, to obtain the first destination address formatted according to the second address format.

11. The method of claim 10, wherein the prefix comprises an IPv6 prefix.

12. The method of claim 9, wherein the first address format comprises IPv6 and the second address format comprises IPv4.

13. The method of claim 9, wherein translating the first data packet comprises at least one of:
    removing a first IPv6 prefix from an IPv4 source address to obtain the IPv4 source address; or
    removing a second IPv6 prefix from an IPv4 destination address to obtain the IPv4 destination address.

14. The method of claim 9, wherein the first destination device is within a first virtual private network.

15. The method of claim 14, wherein the second destination device is within a second virtual private network.

16. The method of claim 15, wherein the first virtual private network and the second virtual private network share the same address space.

17. A computer program product comprising one or more hardware storage devices having stored thereon computer-executable instructions that are executable by one or more processors of a computer system to cause the computer system to route data packets, the computer-executable instructions including instructions that are executable to cause the computer system to perform at least the following:
    receive a first data packet from a first source device over a network, the first data packet formatted according to a first address format and being addressed to a first destination device having a first destination address formatted according to a second different address format, the first data packet comprising a translation of the first destination address that is formatted according to the first address format;
    translate the first data packet from the first address format to the second address format to create a transformed first data packet, the transformed first data packet comprising the first destination address of the first destination device formatted according to the second address format;

deliver the transformed first data packet to the first destination device based on the first destination address that is formatted according to the second address format;

receive a second data packet from a second source device over the network, the second data packet formatted according to the first address format and being addressed to a second destination device having a second destination address that corresponds to the first destination device and that is formatted according to the second address format, the second data packet comprising a translation of the second destination address that is formatted according to the first address format;

translate the second data packet from the first address format to the second address format to create a transformed second data packet, the transformed second data packet comprising the second destination address of the second destination device formatted according to the second address format; and deliver the transformed second data packet to the second destination device based on the second destination address that is formatted according to the second address format.

18. The computer program product of claim 17, wherein translating the first data packet comprises removing a prefix, associated with the first address format, from the first destination address formatted according to a second different address format, to obtain the first destination address formatted according to the second address format.

19. The computer program product of claim 17, wherein the first address format comprises IPv6 and the second address format comprises IPv4.

20. The computer program product of claim 17, wherein the first destination device is within a first virtual private network, wherein the second destination device is within a second virtual private network and wherein the first virtual private network and the second virtual private network share the same address space.

* * * * *